(12) United States Patent
Jung et al.

(10) Patent No.: US 12,482,522 B2
(45) Date of Patent: Nov. 25, 2025

(54) MEMORY DEVICE AND OPERATING METHOD OF THE MEMORY DEVICE FOR REDUCING POWER CONSUMPTION FOR PROGRAM OPERATION

(71) Applicant: SK hynix Inc., Icheon-si (KR)

(72) Inventors: Jae Yeop Jung, Icheon-si (KR); Dong Hun Kwak, Icheon-si (KR); Chan Hui Jeong, Icheon-si (KR)

(73) Assignee: SK hynix Inc., Icheon-si Gyeonggi-do (KR)

( * ) Notice: Subject to any disclaimer, the term of this patent is extended or adjusted under 35 U.S.C. 154(b) by 196 days.

(21) Appl. No.: 18/337,275

(22) Filed: Jun. 19, 2023

(65) Prior Publication Data
US 2024/0203500 A1    Jun. 20, 2024

(30) Foreign Application Priority Data
Dec. 19, 2022   (KR) .................. 10-2022-0178611

(51) Int. Cl.
*G11C 16/10* (2006.01)
*G11C 16/04* (2006.01)
*G11C 16/34* (2006.01)

(52) U.S. Cl.
CPC .......... *G11C 16/10* (2013.01); *G11C 16/0483* (2013.01); *G11C 16/3459* (2013.01)

(58) Field of Classification Search
None
See application file for complete search history.

(56) References Cited

U.S. PATENT DOCUMENTS

| | | | |
|---|---|---|---|
| 2015/0221376 A1* | 8/2015 | Choi | G11C 16/0483 365/185.11 |
| 2017/0084337 A1* | 3/2017 | Joo | G11C 16/08 |

FOREIGN PATENT DOCUMENTS

| | | |
|---|---|---|
| KR | 1020150091666 A | 8/2015 |
| KR | 1020170033514 A | 3/2017 |

* cited by examiner

*Primary Examiner* — Alfredo Bermudez Lozada
(74) *Attorney, Agent, or Firm* — WILLIAM PARK AND ASSOCIATES LTD.

(57) ABSTRACT

A memory device includes: memory cells connected between a common source line and bit lines; a source line driver for applying a common source line voltage to the common source line and then floating the common source line; and a program operation controller for controlling the source line driver to change a length of a floating period in which the common source line is floated, based on a degree to which a program operation on the memory cells is performed.

23 Claims, 9 Drawing Sheets

MEMORY DEVICE AND OPERATING METHOD OF THE MEMORY DEVICE FOR REDUCING POWER CONSUMPTION FOR PROGRAM OPERATION

CROSS-REFERENCE TO RELATED APPLICATION

The present application claims priority under 35 U.S.C. § 119(a) to Korean patent application number 10-2022-0178611 filed on Dec. 19, 2022, in the Korean Intellectual Property Office, the entire disclosure of which is incorporated by reference herein.

BACKGROUND

1. Technical Field

The present disclosure generally relates to an electronic device, and more particularly, to a memory device and an operating method of the memory device.

2. Related Art

A memory system is a device which stores data under the control of a host device. The memory system may include a memory device for storing data and a memory controller for controlling the memory device. The memory device is classified into a volatile memory device and a nonvolatile memory device.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

A program operation is an operation of increasing a threshold voltage of memory cells included in the nonvolatile memory device. The nonvolatile memory device may apply a common source line voltage to a common source line such that the channel potential of program inhibit cells of which threshold voltage is not to increase among the memory cells does not become low in the program operation.

SUMMARY

In accordance with an aspect of the present disclosure, there may be provided a memory device including: memory cells connected between a common source line and bit lines; a source line driver configured to apply a common source line voltage to the common source line and then float the common source line; and a program operation controller configured to control the source line driver to change a length of a floating period in which the common source line is floated, based on a degree to which a program operation on the memory cells is performed.

In accordance with another aspect of the present disclosure, there may be provided a method of operating a memory device, the method including: performing a program voltage apply operation of programming selected memory cells among a plurality of memory cells; determining a length of a floating period in which a common source line is floated, based on a count value of a program loop in which the program voltage apply operation is included; and applying a common source line voltage to the common source line while the program voltage apply operation is performed, and then floating the common source line during the floating period.

In accordance with still another aspect of the present disclosure, there may be provided a memory device including: a plurality of memory cells connected between a common source line and bit lines; a peripheral circuit configured to perform a program operation including a plurality of program loops, in which data is stored in selected memory cells among the plurality of memory cells; and a program operation controller configured to control the peripheral circuit to apply a common source line voltage to the common source line in a program voltage apply operation included in any one program loop among the plurality of program loops and then float the common source line during a floating period, wherein a length of the floating period is determined based on a count value of the one program loop.

In accordance with another aspect of the present disclosure, there may be provided a method of operating a memory device, the method including: sequentially programming memory cells connected between a common source line and bit lines; applying, with a source line driver, a common source line voltage to the common source line and then float the common source line; and controlling, with a program operation controller, the source line driver to change a length of a floating period in which the common source line is floated, based on a degree to which a program operation on the memory cells is performed.

BRIEF DESCRIPTION OF THE DRAWINGS

Examples of embodiments will now be described more fully hereinafter with reference to the accompanying drawings; however, they may be embodied in different forms and should not be construed as limited to the embodiments set forth herein.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Various embodiments provide a memory device and an operating method of the memory device, which can reduce consumption of power or current, required in a program operation.

Figure 1:
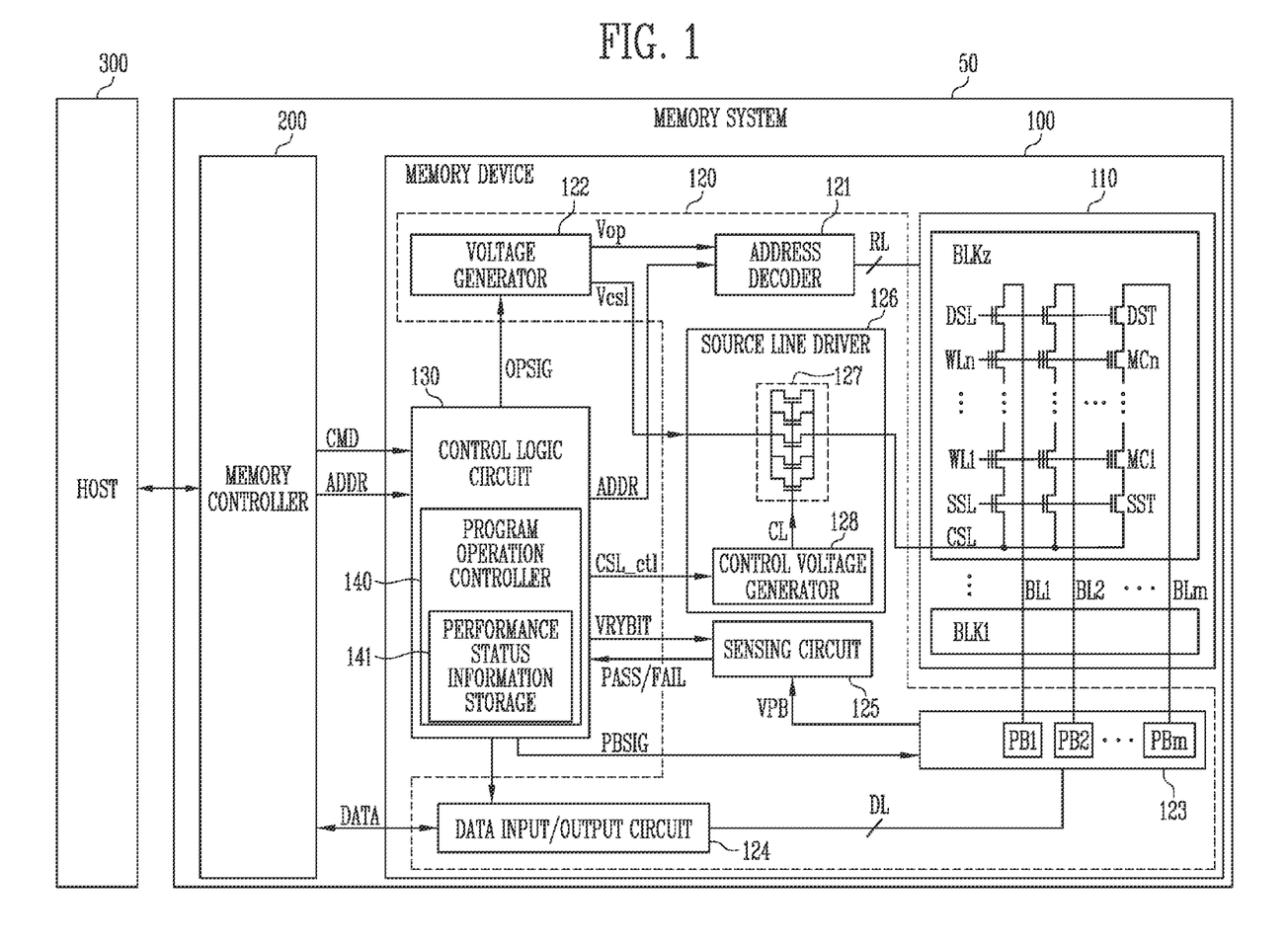
FIG. 1 is a diagram illustrating a memory system including a memory device in accordance with an embodiment of the present disclosure.

FIG. 1 is a diagram illustrating a memory system including a memory device in accordance with an embodiment of the present disclosure.

Referring to FIG. 1, the memory system 50 may include a memory device 100 and a memory controller 200. The memory system 50 may be a device which is included in a mobile phone, a computer, and the like, and stores data under the control of a host 300 as an external device. The memory system 50 may be manufactured as any one of various types of storage devices such as a Solid State Drive (SDD) and a Universal Flash Storage (UFS) according to a host interface as a communication scheme with the host 300. The memory system 50 may be manufactured as any one of various kinds of package types such as a System On Chip (SOC).

The memory device 100 may store data. The memory device 100 may operate under the control of the memory controller 200. In an embodiment, the memory device 100 may be a nonvolatile memory device or a volatile memory device.

The memory device 100 may receive a command CMD and an address ADDR from the memory controller 200, and perform an operation indicated by the command CMD on an area selected by the address ADDR. The memory device 100 may perform a program operation (write operation) of storing data in the area selected by the address ADDR, a read operation of reading data, or an erase operation of erasing data.

In an embodiment, the memory device 100 may include a memory cell array 110, a peripheral circuit 120, and a control logic circuit 130.

The memory cell array 110 may include a plurality of memory blocks BLK1 to BLKz. The plurality of memory blocks BLK1 to BLKz may be connected to an address decoder 121 through row lines RL. The plurality of memory blocks BLK1 to BLKz may be connected to a page buffer group 123 through bit lines BL1 to BLm. Each of the plurality of memory blocks BLK1 to BLKz may include a plurality of memory cells. In an embodiment, the plurality of memory cells may be nonvolatile memory cells.

In an embodiment, any one memory block BLKz among the plurality of memory blocks BLK1 to BLKz may include a plurality of word lines WL1 to WLn arranged in parallel between a drain select line DSL and a source select line SSL. The memory block BLKz may include a plurality of memory cell strings connected between any one bit line and a common source line CSL. The bit lines BL1 to BLm may be respectively connected to the plurality of memory cell strings, and the common source line CSL may be commonly connected to the plurality of memory cell strings.

For example, a memory cell string may include a drain select transistor DST, a plurality of memory cells MC1 to MCn, and a source select transistor SST, which are connected in series between the common source line CSL and a first bit line BL1. One memory cell string may include at least one drain select transistor DST and at least one source select transistor SST.

A drain of the drain select transistor DST may be connected to the first bit line BL1, and a source of the source select transistor SST may be connected to the common source line CSL. The plurality of memory cells MC1 to MCn may be connected in series between the drain select transistor DST and the source select transistor SST. Gates of source select transistors SST included in different memory cells strings may be connected to the source select line SSL, gates of drain select transistors DST included in the different memory cells strings may be connected to the drain select line DSL, and gates of a plurality of memory cells MC1 to MCn included in the different memory cells strings may be connected to the plurality of word lines WL1 to WLn. Memory cells connected to the same word line among the memory cells included in the different memory cells strings may be defined as a physical page (PG). The PG may be a unit of a program operation.

Each of the plurality of memory cells MC1 to MCn may be configured as a Single Level Cell (SLC) storing one-bit data, a Multi-Level Cell (MLC) storing two-bit data, a Triple Level Cell (TLC) storing three-bit data, a Quad Level Cell (QLC) storing four-bit data, or a memory cell storing five-or-more-bit data.

The peripheral circuit 120 may drive the memory cell array 110. For example, the peripheral circuit 120 may drive the memory cell array 110 to perform a program operation, a read operation, and an erase operation under the control of the control logic circuit 130. In another example, the peripheral circuit 120 may apply various operating voltages to the row lines RL and the bit lines BL1 to BLm or discharge the applied voltages under the control of the control logic circuit 130.

The peripheral circuit 120 may include the address decoder 121, a voltage generator 122, the page buffer group 123, a data input/output circuit 124, a sensing circuit 125, and a source line driver 126.

The address decoder 121 may be connected to the memory cell array 110 through the row lines RL. The row lines RL may include drain select lines DSL, a plurality of word lines WL1 to WLn, source select lines SSL.

The address decoder 121 may be operated under the control of the control logic circuit 130. The address decoder 121 may receive an address ADDR from the control logic circuit 130.

The address decoder 121 may decode a block address in the received address ADDR. The address decoder 121 may select at least one memory block among the memory blocks BLK1 to BLKz according to the decoded block address. The address decoder 121 may decode a row address in the received address ADDR. The address decoder 121 may select at least one word line of the selected memory block by applying voltages provided from the voltage generator 122 to the at least one word line according to the decoded row address.

In a program operation, the address decoder 121 may apply a program voltage to the selected word line, and apply a pass voltage having a level lower than a level of the program voltage to unselected word lines. In a program verify operation, the address decoder 121 may apply a verify voltage to the selected word line, and apply a verify pass voltage having a level higher than a level of the verify voltage to the unselected word lines.

The address decoder 121 may decode a column address in the received address ADDR. The decoded column address may be transferred to the page buffer group 123. For example, the address decoder 121 may include components such as a row decoder, a column decoder, and an address buffer.

The voltage generator 122 may generate a plurality of operating voltages Vop by using an external power voltage supplied to the memory device 100. The voltage generator 122 may be operated under the control of the control logic circuit 130.

In an embodiment, the voltage generator 122 may generate an internal power voltage by regulating the external power voltage. The internal power voltage generated by the voltage generator 122 may be used as an operating voltage of the memory device 100.

In an embodiment, the voltage generator 122 may generate various operating voltages Vop used for program, read, and erase operations in response to an operation signal OPSIG. For example, the voltage generator 122 may generate a plurality of erase voltages, a plurality of program voltages, a plurality of pass voltages, a plurality of select read voltages, and a plurality of unselect read voltages. The plurality of generated operating voltages Vop may be supplied to the memory cell array 110 by the address decoder 121.

In an embodiment, the voltage generator 122 may generate a common source line voltage Vcsl to be provided to the common source line CSL in response to the operation signal OPSIG. In an embodiment, the common source line voltage Vcsl may be a power voltage. The voltage generator 122 may provide the common source line voltage Vcsl to the source line driver 126. The common source line voltage Vcsl may be supplied to the common source line CSL through the source line driver 126.

The page buffer group 123 may include first to mth page buffers PB1 to PBm. The first to mth page buffers PB1 to PBm may be connected to the memory cell array 110 respectively through first to mth bit lines BL1 to BLm. The first to mth page buffers PB1 to PBm may be operated under the control of the control logic circuit 130.

The first to mth page buffers PB1 to PBm may communicate data DATA with the data input/output circuit 124. In programming, the first to mth page buffers PB1 to PBm may receive data DATA through the data input/output circuit 124 and data lines DL.

In a program operation, the first to mth page buffers PB1 to PBm may transfer data DATA received through the data input/output circuit 124 to selected memory cells through the bit lines BL1 to BLm. The selected memory cells may be programmed according to the transferred data DATA. A memory cell connected to a bit line through which a program allow voltage (e.g., a ground voltage) is applied may have an increased threshold voltage. A threshold voltage of a memory cell connected to a bit line through which a program inhibit voltage (e.g., a power voltage) is applied may be maintained. In a verify operation, the first to mth page buffers PB1 to PBm may read data DATA stored in the selected memory cells from the selected memory cells through the bit lines BL1 to BLm.

The data input/output circuit 124 may be connected to the first to mth page buffers PB1 to PBm through the data lines DL. The data input/output circuit 124 may be operated under the control of the control logic circuit 130.

The data input/output circuit 124 may include a plurality of input/output buffers (not shown) which receive input data DATA. In a program operation, the data input/output circuit 124 may receive data DATA to be stored from the memory controller 200.

In a verify operation, the sensing circuit 125 may generate a reference current in response to an allow bit VRYBIT generated by the control logic circuit 130, and output a pass signal PASS or a fail signal FAIL to the control logic circuit 130 by comparing a sensing voltage VPB received from the page buffer group 123 with a reference voltage generated by the reference current. For example, the sensing circuit 125 may output the pass signal PASS to the control logic circuit 130 when a magnitude of the sensing voltage VPB is smaller than a magnitude of the reference voltage. In another example, the sensing circuit 125 may output the fail signal FAIL to the control logic circuit 130 when the magnitude of the sensing voltage VPB is greater than the magnitude of the reference voltage.

The source line driver 126 may apply the common source line voltage Vcsl provided from the voltage generator 122 to the common source line CSL or float the common source line CSL, in response to a common source line control signal CSL_ctl of the control logic circuit 130.

In an embodiment, the source line driver 126 may include a plurality of transistors 127 and a control voltage generator 128. The plurality of transistors 127 may receive the common source line voltage Vcsl provided from the voltage generator 122 and transfer the common source line voltage Vcsl to the common source line CSL. Gates of the plurality of transistors 127 may be commonly connected to a control line CL, and the control line CL may be connected to the control voltage generator 128.

The control voltage generator 128 may apply a voltage to the control line CL in response to the common source line control signal CSL_ctl. In an embodiment, the control voltage generator 128 may apply a turn-on voltage in response to the activated common source line control signal CSL_ctl. The turn-on voltage may be a voltage higher than a threshold voltage of the plurality of transistors 127. The common source line voltage Vcsl may be transferred to a common source line CSL.

In another embodiment, the control voltage generator 128 may apply a ground voltage to the control line CL in response to the inactivated common source line control signal CSL_ctl. When the ground voltage is applied to the control line CL, the common source line voltage Vcsl may be blocked from being transferred to the common source line CSL. That is, the common source line CSL may be floated as the ground voltage is applied to the control line CL.

The control logic circuit 130 may be connected to the address decoder 121, the voltage generator 122, the page buffer group 123, the data input/output circuit 124, the sensing circuit 125, and the source line driver 126. The control logic circuit 130 may control a general operation of the memory device 100. The control logic circuit 130 may be operated in response to a command CMD transferred from the memory controller 200.

The control logic circuit 130 may control the peripheral circuit 120 by generating several signals in response to a command CMD and an address ADDR. For example, the control logic circuit 130 may generate the operation signal OPSIG, the address ADDR, a page buffer control signal PBSIG, the allow bit VRYBIT, and the common source line control signal CSL_ctl in response to the command CMD and the address ADDR. The control logic circuit 130 may output the operation signal OPSIG to the voltage generator 122, output the address ADDR to the address decoder 121, output the page buffer control signal PBSIG to the page buffer group 123, output the allow bit VRYBIT to the sensing circuit 125, and output the common source line control signal CSL_ctl to the source line driver 126. Also, the control logic circuit 130 may determine whether the verify operation has passed or failed in response to the pass or fail signal PASS/FAIL output by the sensing circuit 125.

In an embodiment, the control logic circuit 130 may include a program operation controller 140. The program operation controller 140 may control a program operation on memory cells. The program operation controller 140 may control the peripheral circuit to apply a program voltage to a word line connected to the memory cells in the program operation. In the program operation, the program operation controller 140 may control the source line driver 126 to apply the common source line voltage Vcsl to the common source line CSL and then float the common source line CSL.

In an embodiment, the source line driver 126 may apply the common source line voltage Vcsl provided from the voltage generator 122 to the common source line CSL in response to the activated common source line control signal CSL_ctl. In an embodiment, the source line driver 126 may float the common source line CSL in response to the inactivated common source line control signal CSL_ctl.

The program operation controller 140 may include a performance status information storage 141. The performance status information storage 141 may store performance status information representing a degree to which the program operation is performed. The performance status information may be information changed according to the degree to which the program operation is performed. In an embodiment, the performance status information may be information having a value increased as the program operation is performed.

For example, the performance status information may include at least one of a number of times a plurality of program loops are performed, a number of memory cells programmed to a target program state among the memory cells, a magnitude of a threshold voltage in a program state in which a pass/fail check operation is performed, and a magnitude of a program voltage applied to a word line connected to the memory cells.

In an embodiment, the program operation controller 140 may control the source line driver 126 to change a length of a floating period in which the common source line CSL is floated, based on the performance status information stored in the performance status information storage 141 in the program operation.

In an embodiment, the program operation controller 140 may determine the length of the floating period, based on the performance status information and a reference value. For example, when the number of times the plurality of program loops are performed is smaller than a first reference count value, the program operation controller 140 may determine the length of the floating period as a first length. When the number of times the plurality of program loops are performed is equal to greater than the first reference count value, the program operation controller 140 may determine the length of the floating period as a second length shorter than the first length. The program operation controller 140 may control the source line driver 126 such that the length of the floating period becomes shorter, based on the number of time the plurality of program loops are performed.

The memory controller 200 may control overall operations of the storage system 50.

The memory controller 200 may control the memory device 100 to perform a write operation, a read operation, an erase operation, or the like according to a request of the host 300. The memory controller 200 may provide a command, a physical address, or data to the memory device 100 according to the write operation, the read operation, or the erase operation.

In an embodiment, the memory controller 200 may autonomously generate a command, an address, and data, regardless of any request from the host 300, and transmit the command, the address, and the data to the memory device 100. For example, the memory controller 200 may provide the memory device 100 with a command, an address, and data, which are used to perform read and write operations accompanied in performing wear leveling, read reclaim, garbage collection, or the like.

The host 300 may communicate with the memory system by using various communication schemes such as a Dual In-line Memory Module (DIMM).

Figure 2:
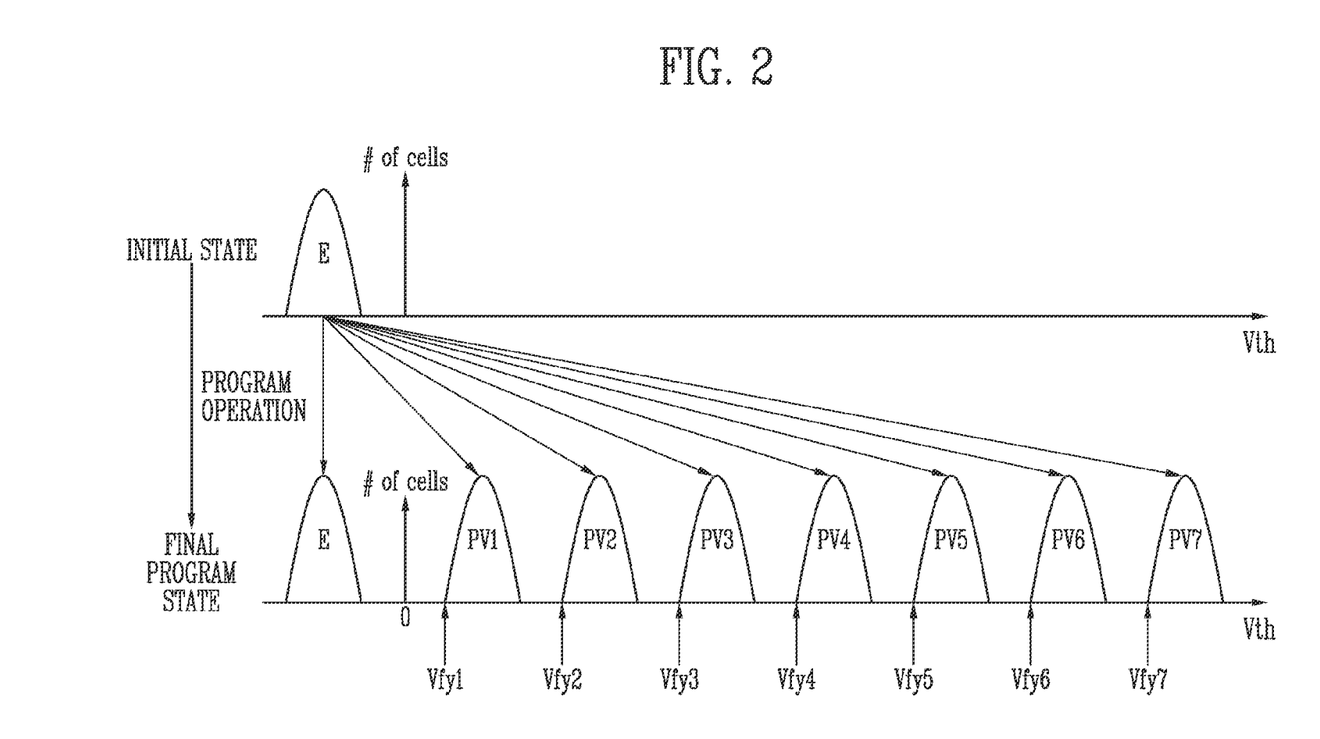
FIG. 2 is a diagram illustrating a threshold voltage distribution of memory cells according to a program operation.

FIG. 2 is a diagram illustrating a threshold voltage distribution of memory cells according to a program operation.

In FIG. 2, the horizontal axis of a graph represents threshold voltage Vth of memory cells, and the vertical axis of the graph represents number of memory cells (# of cells).

Referring to FIG. 2, the threshold voltage distribution of the memory cells may be changed from an initial state to a final program state according to the program operation.

In FIG. 2, a case where one memory cell is programmed to a triple-level cell (TLC) storing three-bit data is assumed and described.

The initial state is a state in which the program operation is not performed, and the threshold voltage distribution of the memory cells may be an erase state E.

The final program state may be a threshold voltage distribution of memory cells on which the program operation is performed. The memory cells on which the program operation is performed may have a threshold voltage corresponding to any one program state among a plurality of program states. For example, when one memory cells is programmed as a TLC storing three-bit data, the plurality of program states may mean an erase state E and first to seventh program states PV1 to PV7.

In an embodiment, the memory cells on which the program operation is performed may have a threshold voltage corresponding to any one program state among the erase state E and the first to seventh program states PV1 to PV7. The threshold voltage of memory cells in the initial state may increase to a threshold voltage corresponding to any one program state among the erase state E and the first to seventh program states PV1 to PV7 through the program operation.

Each of the memory cells may have, as a target program state, any one program state among the erase state E and the first to seventh program states PV1 to PV7. The target program state may be determined according to data to be stored in the memory cell. Each of the memory cells may have, as the target program state, any one program state among the erase state E and the first to seventh program states PV1 to PV7, which are a plurality of program states, according to data to be stored therein. Each of the memory cells may have a threshold voltage corresponding to the target program state among the plurality of program states according to the program operation.

Figure 3:
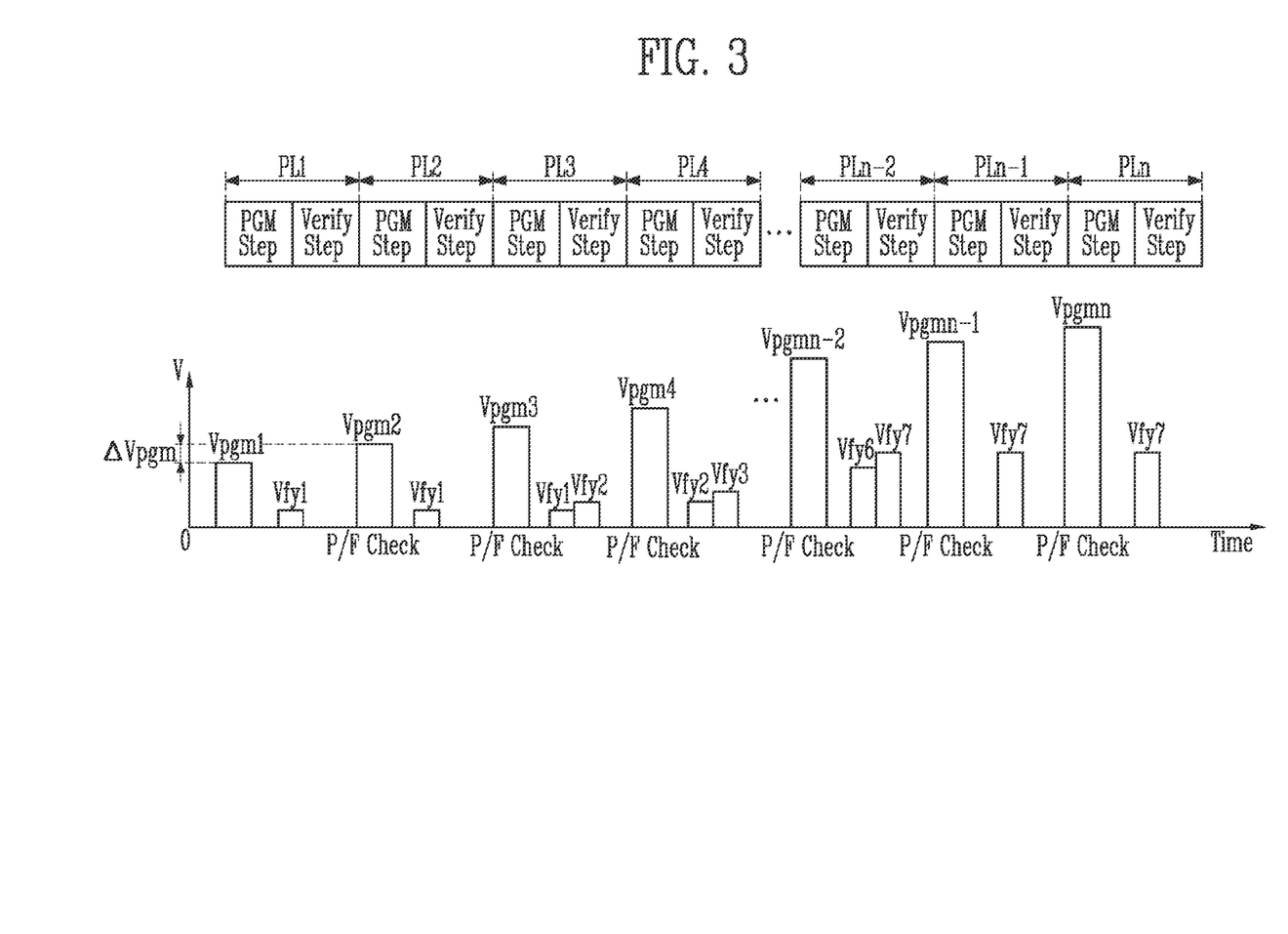
FIG. 3 is a diagram illustrating a program operation including a plurality of program loops.

FIG. 3 is a diagram illustrating a program operation including a plurality of program loops.

In FIG. 3, the horizontal axis of a graph represents time Time, and the vertical axis of the graph represents voltage V applied to a word line. The voltage V applied to the word line may include a program voltage Vpgm and a verify voltage V_vfy.

In FIG. 3, a case where one memory cell is programmed as a TLC storing three-bit data is assumed and described. However, the scope of the present disclosure is not limited thereto, and one memory cell may be programmed to store two-or-one-bit data or store four-or-more-bit data.

Referring to FIG. 3, the memory device 100 may perform a program operation which may include a plurality of program loops PL1 to PLn. The memory device 100 may perform the plurality of program loops PL1 to PLn such that each of selected memory cells connected to a selected word line has a threshold voltage corresponding to a target program state.

Each of plurality of program loops PL1 to PLn may include a program voltage apply operation PGM Step and a verify operation Verify Step.

The program voltage apply operation PGM Step may be an operation of applying a program voltage to the selected word line to which the selected memory cells are connected. The program voltage apply operation PGM Step may be an operation of increasing a threshold voltage of the selected memory cells by using the program voltage.

The verify operation Verify Step may be an operation of applying a verify voltage to the selected word line to which the selected memory cells are connected. The verify operation Verify Step may be an operation of identifying the threshold voltage of the memory cells, which is increased by the program voltage apply operation. Specifically, the verify operation Verify Step may be an operation of acquiring sensed data through a bit line connected to the memory cells when the verify voltage is applied to the word line connected to the memory cells. When the threshold voltage of the memory cells is higher than the verify voltage in the verify operation Verify Step, data corresponding to an off-cell may be sensed. When the threshold voltage of the memory cells is lower than the verify voltage in the verify operation Verify Step, data corresponding to an on-cell may be sensed.

The memory device 100 may perform, in parallel, a pass/fail check operation P/F Check while performing the program voltage apply operation PGM Step. The pass/fail check operation P/F Check may be an operation of determining a result of the verify operation, based on data sensed by the verify operation. The pass/fail check operation P/F Check may be an operation of determining whether the result of the verify operation is PASS or FAIL, based on a result obtained by comparing a number of on-cells identified by the verify operation among the memory cells with a reference on-cell number. When the number of on-cells is greater than the reference on-cell number in the pass/fail check operation P/F Check, the result of the verify operation may be FAIL. When the number of on-cells is smaller than the reference on-cell number in the pass/fail check operation P/F Check, the result of the verify operation may be PASS.

In a first program loop PL1, the memory device 100 may apply a first program voltage Vpgm1 to the selected word line to which the selected memory cells are connected and then apply a first verify voltage Vfy1 to the selected word line. The first verify voltage Vfy1 may be a voltage corresponding to a first program state. In the first program loop PL1, the memory device 100 may identify a threshold voltage of first memory cells having the first program state as a target program state among the selected memory cells by using the first verify voltage Vfy1.

In a second program loop PL2, the memory device 100 may apply a second program voltage Vpgm2 to the selected word line. The second program voltage Vpgm2 may be a voltage higher by a unit program voltage $\Delta$Vpgm than the first program voltage Vpgm1. The memory device 100 may perform the pass/fail check operation P/F Check on the first memory cells having the first program state as the target program state among the selected memory cells while applying the second program voltage Vpgm2 to the selected word line.

When the pass/fail check operation P/F Check fails, it may be determined that the threshold voltage of the first memory cells does not increase to a threshold voltage corresponding to the first program state. In the second program loop PL2, the memory device 100 may apply the first verify voltage Vfy1 to the selected word line to identify the threshold voltage of the first memory cells, which is increased by the second program voltage Vpgm2.

After that, in a third program loop PL3, the memory device 100 may perform the pass/fail check operation P/F Check on the first program state while applying a third program voltage Vpgm3 to the selected word line. In the third program loop PL3, when the pass/fail check operation P/F Check on the first program state fails, the first verify voltage Vfy1 and a second verify voltage Vfy2 may be applied to the selected word line. The second verify voltage Vfy2 may be a voltage for identifying a threshold voltage of second memory cells having the second program state as a target program state among the selected memory cells.

In a fourth program loop PL4, the memory device 100 may perform the pass/fail check operation P/F Check on the first program state while applying a fourth program voltage Vpgm4 to the selected word line. When the pass/fail check operation P/F Check passes, it may be determined that the first memory cells have the threshold voltage corresponding to the first program state. After that, in a verify operation of the fourth program loop PL4, the memory device 100 may apply the second verify voltage Vfy2 and a third verify voltage Vfy3 to the selected word line.

The memory device 100 may perform the pass/fail check operation P/F Check on memory cells having any one of second to seventh program states as a target program state, identically to the pass/fail check operation P/F Check on the first memory cells. In an embodiment, when the pass/fail check operation P/F Check on the second memory cells having the second program state as the target program state among the selected memory cells passes, the pass/fail check operation P/F Check on third memory cells having the third program state as a target program state may be performed. The memory device 100 may sequentially perform the pass/fail check operation P/F Check on the first to seventh program states.

In an embodiment, in an nth program loop PLn, the memory device 100 may apply an nth program voltage Vpgmn to the selected word line and then apply a seventh verify voltage Vfy7 to the selected word line. The memory device 100 may perform the pass/fail check operation P/F Check on seventh memory cells having the seventh program state as a target program state among the selected memory cells while applying the nth program voltage Vpgmn to the selected word line. When the pass/fail check operation P/F Check on the seventh program state passes, a next program loop might not be performed. When the pass/fail check operation P/F Check on the seventh program state passes, it may be determined that each of the memory cells has a threshold voltage corresponding to the target program state.

In an embodiment, a program voltage may be determined according to an Incremental Step Pulse Programming (ISPP) method. The magnitude of the program voltage may stepwisely increase or decrease as the plurality of program loops PL1 to PLn are repeated. A number of times program voltages used for the respective program loops are applied, a voltage level of the program voltages, a time at which the program voltage are applied, and the like may be determined in various forms under the control of the memory controller 200.

Figure 4:
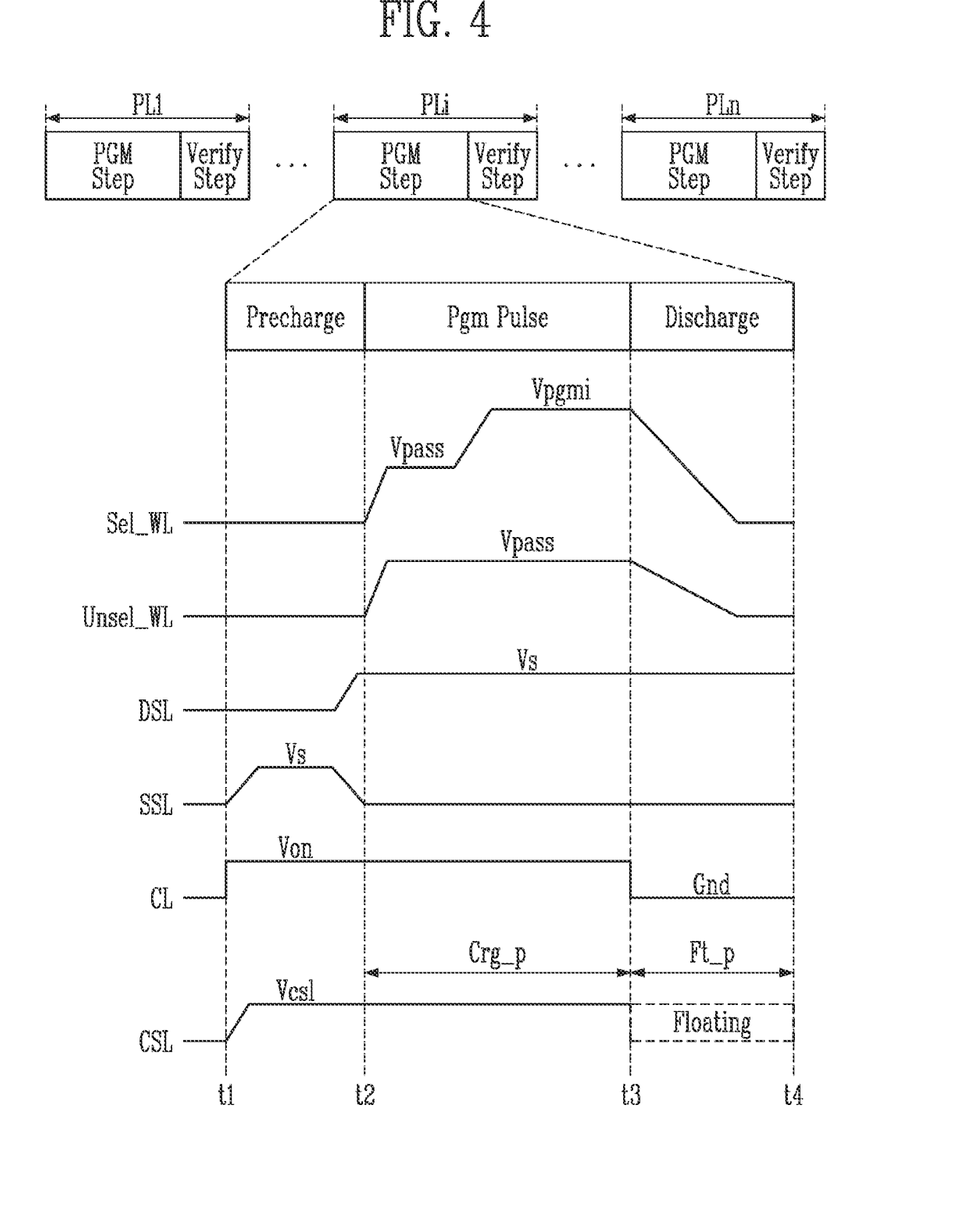
FIG. 4 is a diagram illustrating a program voltage apply operation included in a program loop.

FIG. 4 is a diagram illustrating a program voltage apply operation included in a program loop.

Referring to FIG. 4, each of a plurality of program loops PL1 to PLn may include a program voltage apply operation PGM Step and a verify operation Verify Step. The program voltage apply operation PGM Step may include a precharge period Precharge, a program pulse period Pgm Pulse, and a discharge period Discharge. In FIG. 4, an ith program loop PLi will be mainly described.

Period t1 to t2 may be a precharge period Precharge. The precharge period Precharge may be a period in which a channel region of memory cells is precharged. In the period t1 to t2, the memory device 100 may apply a select line voltage Vs to a source select line SSL. The select line voltage Vs may be a voltage higher than a threshold voltage of source select transistors connected to the source select line SSL. In the period t1 to t2, the memory device 100 may apply a turn-on voltage Von to a control line CL. In the period t1 to t2, the memory device 100 may apply a common source line voltage Vcsl to a common source line CSL. In an embodiment, referring to FIG. 1, the program operation controller 140 may provide the activated common source line control signal CSL_ctl to the source line driver 126. The source line driver 126 may apply, to the common source line CSL, the common source line voltage Vcsl provided from the voltage generator 122 in response to the activated common source line control signal CSL_ctl.

Period t2 to t3 may be a program pulse period Pgm Pulse. The program pulse period Pgm Pulse may be a period in which a threshold voltage of selected memory cells connected to a selected word line is increased using a program voltage. In the period t2 to t3, the memory device 100 may apply a pass voltage Vpass to a selected word line Sel_WL and then apply an ith program voltage Vpgmi to the selected word line Sel_WL. In the period t2 to t3, the memory device 100 may apply the pass voltage Vpass to unselected word lines Unsel_WL. In the period t2-t3, the memory device 100 may apply the turn-on voltage to the control line CL, and apply the common source line voltage Vcsl to the common source line CSL. In an embodiment, the memory device 100 may apply the common source line voltage Vcsl to the common source line CSL during a charge period Crg_p.

The memory device 100 may apply the select line voltage Vs to the drain select line DSL before applying the pass voltage Vpass to the selected word line Sel_WL.

Period t3 to t4 may be a discharge period Discharge. The discharge period Discharge may be a period in which a voltage of a plurality of word lines including the selected word line Sel_WL and the unselected word lines Unsel_WL is discharged. In an embodiment, the memory device 100 may apply a ground voltage to the selected word line Sel_WL and the unselected word lines Unsel_WL. In another embodiment, the memory device 100 may apply an equalizing voltage to the selected word line and the unselected word line. The equalizing voltage may be a voltage applied such that the selected word line and the unselected word line have the same voltage magnitude.

In the period t3 to t4, the memory device 100 may apply a ground voltage Gnd to the control line CL. In the period t3 to t4, the memory device 100 may float the common source line CSL. In an embodiment, referring to FIG. 1, the program operation controller 140 may provide the inactivated common source line control signal CSL_ctl to the source line driver 126. The source line driver 126 may apply the ground voltage Gnd to the control line CL in response to the inactivated common source line control signal CSL_ctl. The source line driver 126 applies to the ground voltage Gnd to the control line CL, so that the common source line voltage Vcsl provided from the voltage generator 122 can be blocked from being applied to the common source line CSL. In an embodiment, the memory device 100 may float the common source line CSL during a floating period Ft_p.

Meanwhile, the memory device 100 may apply the common source line voltage Vcsl to the common source line CSL such that the channel potential of program inhibited memory cells does not become low in a program voltage apply operation PGM Step. However, in an embodiment, the memory device 100 may consume a lot of power or current to apply the common source line voltage Vcsl to the common source line CSL. In an embodiment, because the number of program-inhibited memory cells is small in initial program loops in which the degree to which the program operation is performed is low, the memory device 100 may decrease a time for which the common source line voltage Vcsl is applied to the common source line CSL and increase a time for which the common source line CSL is floated to reduce the consumption of power or current.

Accordingly, the memory device 100 may change lengths of the charge period Crg_p and the floating period Ft_p, based on the degree to which the program operation on the selected memory cells is performed. The charge period Crg_p and the floating period Ft_p may be periods included in the program pulse period Pgm Pulse and the discharge period Discharge, respectively.

Figure 5:
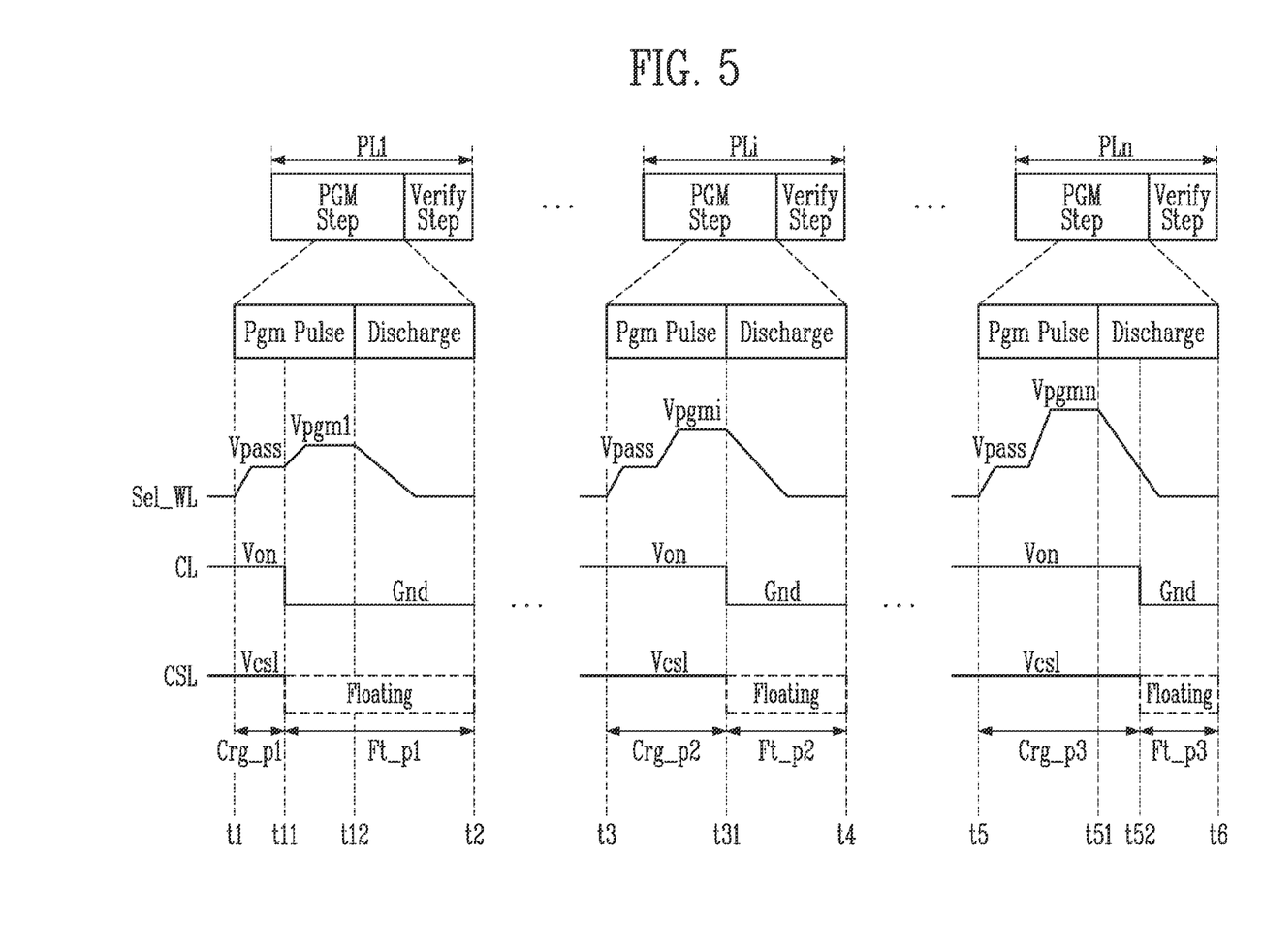
FIG. 5 is a diagram illustrating an operation of changing a length of a floating period, based on a degree to which a program operation is performed.

FIG. 5 is a diagram illustrating an operation of changing a length of a floating period, based on a degree to which a program operation is performed.

In FIG. 5, only a program pulse period and a discharge period, which are included in a program voltage apply operation of each program loop will be described.

Referring to FIG. 5, period t1 to t2 may correspond to a program pulse period and a discharge period of the first program loop PL1. In period t1 to t11, the memory device 100 may apply the pass voltage Vpass to the selected word line Sel_WL. In the period t1 to t11, the memory device 100 may apply the turn-on voltage to the control line CL. In the period t1 to t11, the memory device 100 may apply the common source line voltage Vcsl to the common source line CSL during a first charge period Crg_p1.

The memory device 100 may apply the first program voltage Vpgm1 to the selected word line Sel_WL in period t11 to t12, and then discharge the voltage of the selected word line Sel_WL in period t12 to t2.

In period t11 to t2, the memory device 100 may apply the ground voltage Gnd to the control line CL. In the period t11 to t2, the memory device 100 may float the common source line CSL during a first floating period Ft_p1. In the first program loop PL1, a length of the first charge period Crg_p1 may be shorter than a length of the first floating period Ft_p1.

Period t3 to t4 may correspond to a program pulse period and a discharge period of the ith program loop PLi. In period t3 to t31, the memory device 100 may apply the pass voltage Vpass to the selected word line Sel_WL and then apply the ith program voltage Vpgmi to the selected word line Sel_WL. In the period t3 to t31, the memory device 100 may apply the common source line voltage Vcsl to the common source line CSL during a second charge period Crg_p2. A length of the second charge period Crg_p2 may be longer than the length of the first charge period Crg_p1.

In period t31 to t4, the memory device 100 may discharge the voltage of the selected word line Sel_WL. In the period t31 to t4, the memory device 100 may apply the ground voltage Gnd to the control line CL. In the period t31 to t4, the memory device 100 may float the common source line CSL during a second floating period Ft_p2. A length of the second floating period Ft_p2 may be shorter than the length of the first floating period Ft_p1. In an embodiment, the lengths of the second charge period Crg_p2 and the second floating period Ft_p2 may be the same.

Period t5 to t6 may correspond to a program pulse period and a discharge period of the nth program loop PLn. In period t5 to t51, the memory device 100 may apply the pass voltage Vpass to the selected word line Sel_WL and then the nth program voltage Vpgmn to the selected word line Sel_WL. In period t51 to t6, the memory device 100 may discharge the voltage of the selected word line Sel_WL.

In period t5 to t52, the memory device 100 may apply the turn-on voltage Von to the control line CL. In the period t5 to t52, the memory device 100 may apply the common source line voltage Vcsl to the common source line CSL during a third charge period Crg_p3. A length of the third charge period Crg_p3 may be longer than the length of the second charge period Crg_p2.

In period t52 to t6, the memory device 100 may apply the ground voltage Gnd to the control line CL. In the period t52 to t6, the memory device 100 may float the common source line CSL during a third floating period Ft_p3. A length of the third floating period Ft_p3 may be shorter than the length of the second floating period Ft_p2. In an embodiment, the length of the third charge period Crg_p3 may be longer than the length of the third floating period Ft_p3.

In an embodiment, as a program operation is performed, the length of a charge period becomes long, and the length of a floating period may become shorter. In an embodiment, the memory device 100 may change the length of the floating period, based on a degree to which the program operation is performed.

In an embodiment, the length of the floating period may be determined based on a result obtained by comparing performance status information representing a degree to which the program operation is performed with reference values. For example, the memory device 100 may determine the length of the floating period, based on a result obtained by comparing a number of times a plurality of program loops are performed (i.e., a count value of a program loop) with reference count values. In an embodiment, the count value of the program loop may increase as the program operation is performed.

In an embodiment, when the count value of the program loop is smaller than a first reference count value, the memory device 100 may determine the length of the floating period as a first length. In an embodiment, when the count value of the program loop is equal to or greater than the first reference count value, the memory device 100 may determine the length of the floating period as a second length shorter than the first length. In an embodiment, when the count value of the program loop is equal to or greater than a second reference count value greater than the first reference count value, the memory device 100 may determine the length of the floating period as a third length shorter than the second length.

For example, when the count value of the program loop is smaller than i as the first reference count value, the memory device 100 may float the common source line CSL during the first floating period Ft_p1. The memory device 100 may float the common source line CSL during the first floating period Ft_p1 until first to (i−1)th program loops PL1 to PLi−1 are performed. The first to (i−1)th program loops PL1 to PLi−1 among the plurality of program loops may correspond to an initial period.

In an embodiment, when the count value of the program loop is equal to or greater than i as the first reference count value and is smaller than n as the second reference count value, the memory device 100 may determine the length of floating period as the second length shorter than the first length. The memory device 100 may float the common source line CSL during the second floating period Ft_p2 until ith to (n−1)th program loops PLi to PLn−1 are performed. The ith to (n−1)th program loops PLi to PLn−1 among the plurality of program loops may correspond to a middle period.

In an embodiment, when the count value of the program loop is equal to or greater than n as the second reference count value, the memory device 100 may determine the length of the floating period as the third length short than the second length. The memory device 100 may float the common source line CSL during the third floating period Ft_p3 in the nth program loop PLn. The nth program loop PLn among the plurality of program loops may correspond to an end period.

In an embodiment, identically to that the length of the floating period is determined based on the result obtained by comparing the count value of the program loop with the reference values, the memory device may determine the length of the floating period, based on a result obtained by comparing reference values with at least one of a magnitude of the program voltage applied to the selected word line, a number of memory cells programmed to a target program state among the selected memory cells, and a magnitude of a threshold voltage in a program state in which the pass/fail check operation is performed.

The magnitude of the program voltage applied to the selected word line, the number of memory cells programmed to the target program state among the selected memory cells, and the magnitude of the threshold voltage in the program state in which the pass/fail check operation is performed may increase as the program operation is performed.

Figure 6:
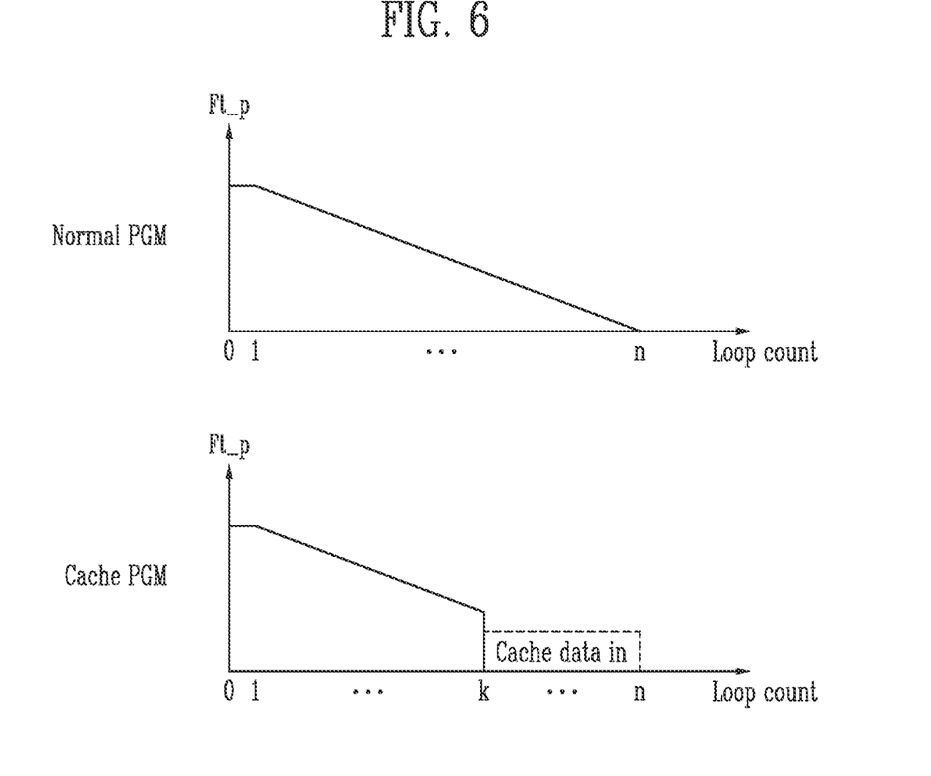
FIG. 6 is a diagram illustrating a length of a floating period changed in a normal program operation or a cache program operation.

FIG. 6 is a diagram illustrating a length of a floating period changed in a normal program operation or a cache program operation.

In FIG. 6, the horizontal axis of a graph represents count value Loop count of a program loop, and the vertical axis of the graph represents length Ft_p of a floating period.

Referring to a graph illustrated at an upper end shown in FIG. 6, the length of a floating period in the normal program operation may become shorter as the count value of the program loop increases. Specifically, the length of the floating period may be longest when the count value of the program loop is 1 (the first program loop), and be shortest when the count value of the program loop is n (the nth program loop). The length of the floating period may gradually become shorter as the count value of the program loop increases.

In an embodiment, the length of the floating period may be 0 in the nth program loop. That is, in the program pulse period and the discharge period, which are included in the nth program loop, the memory device 100 does not float the common source line but may apply the common source line voltage to the common source line.

Referring to a graph illustrated at a lower end shown in FIG. 6, the length of a floating period in the cache program operation may become shorter as the count value of the program loop increases. However, the length of the floating period may be 0 in a period in which cache data is received from the memory controller. The memory device 100 might not float the common source line in the period in which the cache data is received. When the input of the cache data and the floating of the common source line overlap with each other, the voltage of the common source line may be changed according to power noise or the like. The cache data may be data to be stored in memory cells to be programmed next to the selected memory cells after the program operation of the selected memory cells is performed.

In an embodiment, in kth to nth program loops Loop count k to n in which the cache data is received, the memory device 100 does not float the common source line but may apply the common source line voltage to the common source line.

Figure 7:
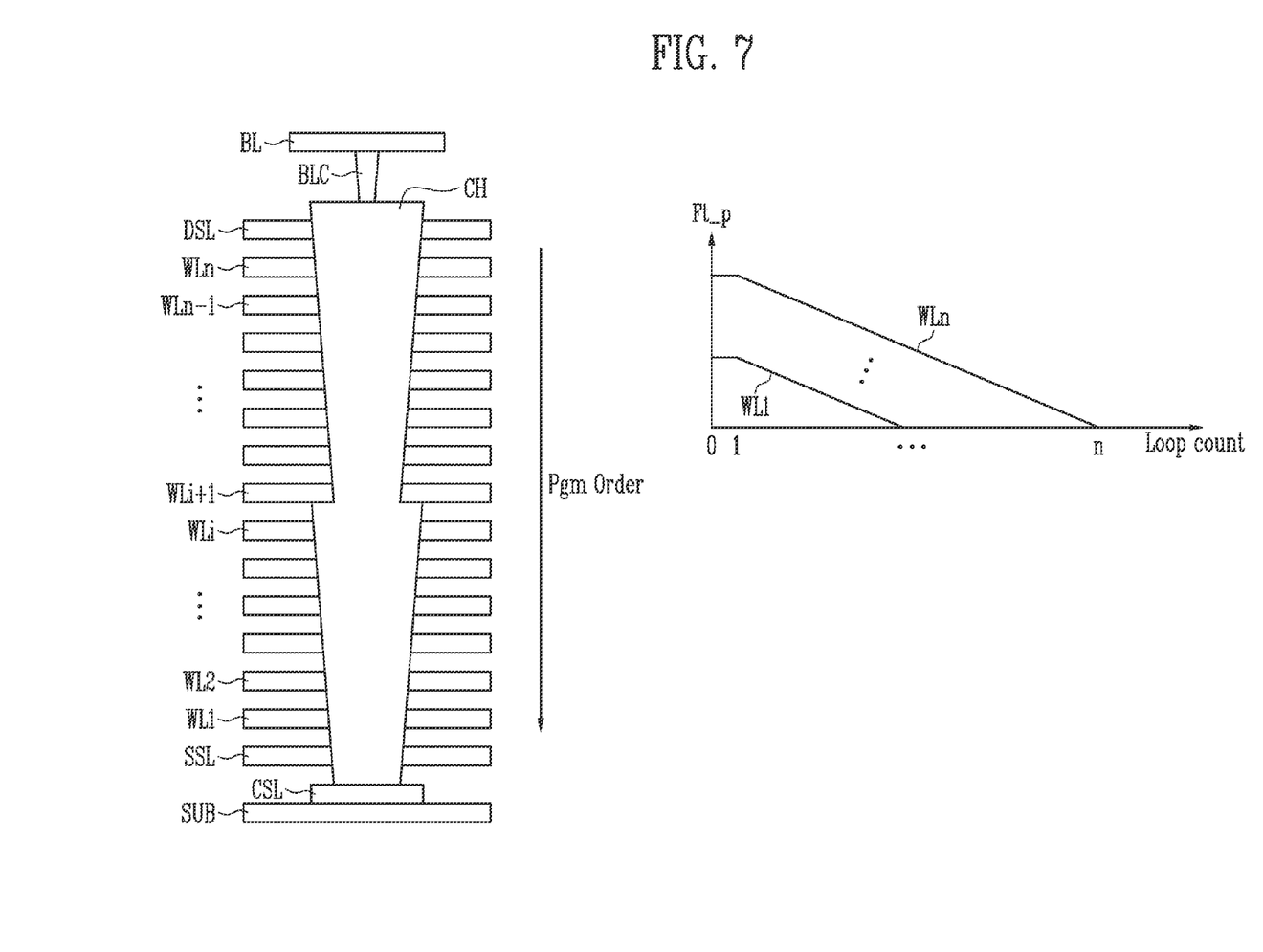
FIG. 7 is a diagram illustrating an operation of changing a length of a floating period, based on a position of a selected word line.

FIG. 7 is a diagram illustrating an operation of changing a length of a floating period, based on a position of a selected word line.

Referring to FIG. 7, the memory cell array shown in FIG. 1 may include a plurality of memory cells stacked along a channel region CH. The plurality of memory cells may be located in regions in which a plurality of word lines WL1 to WLn and the channel region CH intersect each other. The plurality of memory cells may be respectively connected to the plurality of word lines WL1 to WLn.

The channel region CH may be connected between a common source line CSL and a bit line BL. The common source line CSL may be in contact with a bottom surface of the channel region CH. The common source line CSL may be in contact with a substrate SUB. The bit line BL may be electrically connected to the channel region CH through a bit line contact plug BLC.

In an embodiment, the memory device 100 may determine a length $Ft\_p$ of a floating period in which the common source line is floated according to the position of a selected word line in a program operation.

A program operation in a reverse order in which the word lines are programmed from an nth word line WLn to a first word line WL1 will be described as an example. As the number of programmed word lines becomes larger, a channel potential increasing when the common source line voltage is applied to the common source line CSL may become lower.

For example, as for the nth word line WLn programmed firstly, the channel potential may sufficiently increase even when the time for which the common source line voltage is applied to the common source line CSL is short. The memory device 100 may determine the length of the floating period as a longest length when the selected word line is the nth word line WLn.

As for the first word line WL1 programmed lastly, the time for which the common source line voltage is applied to the common source line CSL may be longest such that the channel potential sufficiently increases. The memory device 100 may determine the length of the floating period as a shortest length when the selected word line is the first word line WL1.

That is, in an embodiment, the length of the floating period may become longer as the selected word line is more adjacent to a drain select line DSL, and become shorter as the selected word line becomes more adjacent to a source select line SSL.

In an embodiment, the memory device 100 may determine the length $Ft\_p$ of the floating period in which the common source line CSL is floated, based on the number of programmed word lines among the plurality of word lines WL1 to WLn. In an embodiment, the length of the floating period may become shorter as the number of programmed word lines becomes larger. In an embodiment, when the selected word line is the nth word line WLn, no programmed word line exists, and therefore, the length of the floating period may be longest. In addition, in an embodiment, when the selected word line is the first word line WL1, the number of programmed word lines is largest as second to nth word lines WL2 to WLn, and therefore, the length of the floating period may be shortest.

Figure 8:
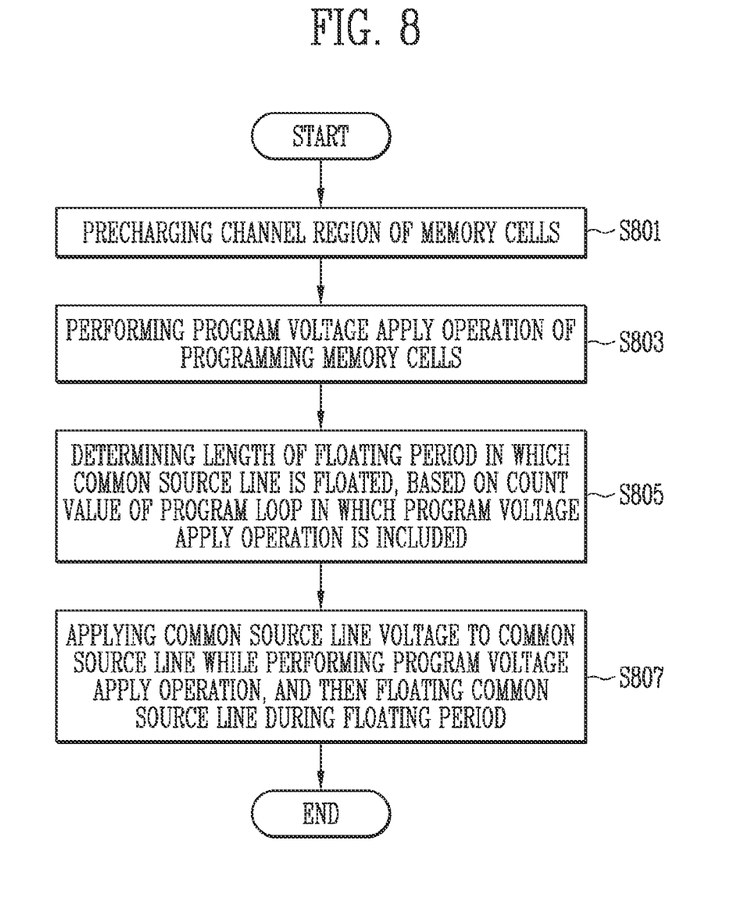
FIG. 8 is a flowchart illustrating a program operation of the memory device in accordance with an embodiment of the present disclosure.

FIG. 8 is a flowchart illustrating a program operation of the memory device in accordance with an embodiment of the present disclosure.

Referring to FIG. 8, in step S801, the memory device 100 may precharge a channel region of memory cells. The memory device 100 may apply a select line voltage to a source select line and apply a common source line voltage to a common source line.

In step S803, the memory device 100 may perform a program voltage apply operation PGM Step of programming the memory cells. The program voltage apply operation may include a program pulse period in which a program voltage is applied to a word line connected to the memory cells and a discharge period in which a voltage of the word line is discharged.

In step S805, the memory device 100 may determine a length of a floating period in which the common source line is floated, based on a count value of a program loop in which the program voltage apply operation is included. In an embodiment, the length of the floating period may become longer as the count value of the program loop becomes smaller, and become shorter as the count value of the program loop becomes larger.

In step S807, the memory device 100 may apply the common source line voltage to the common source line while performing the program voltage apply operation, and then float the common source line during the floating period.

Figure 9:
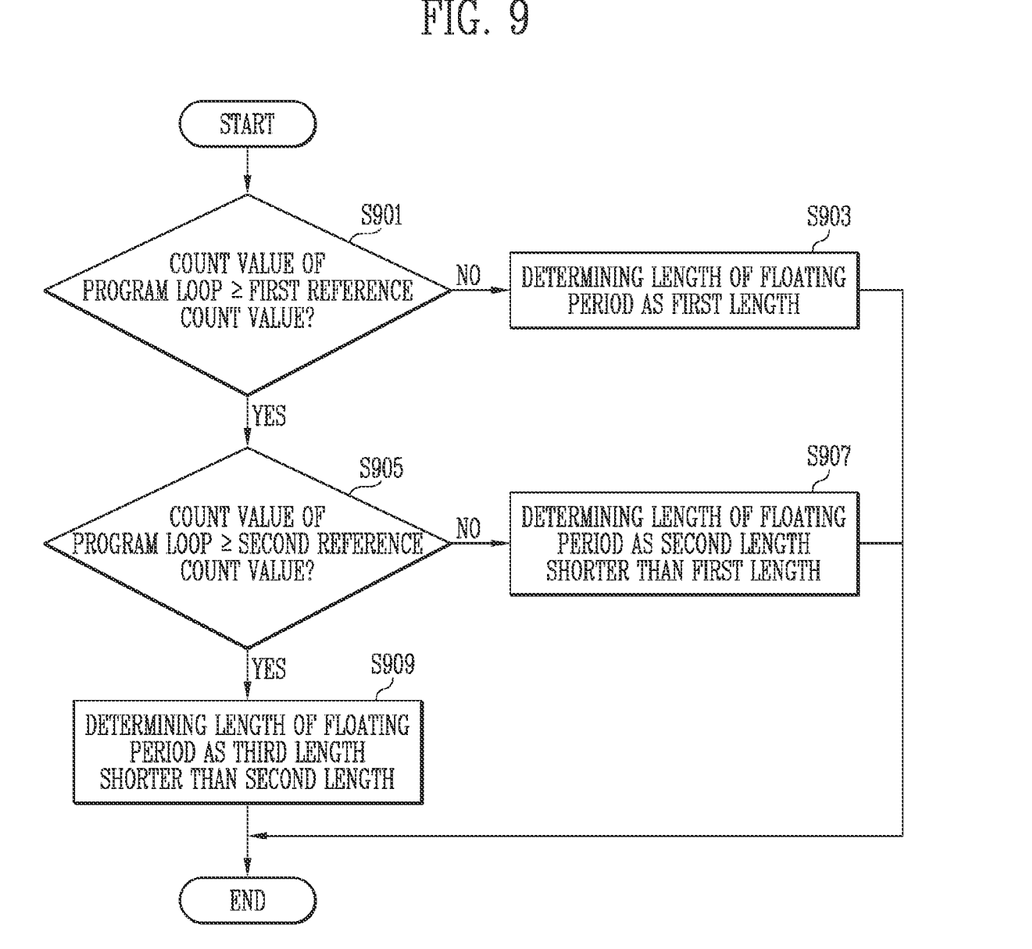
FIG. 9 is a flowchart illustrating an operation of determining a length of a floating period in accordance with an embodiment of the present disclosure.

FIG. 9 is a flowchart illustrating an operation of determining a length of a floating period in accordance with an embodiment of the present disclosure.

FIG. 9 may be a flowchart obtained by materializing the step S805 shown in FIG. 8. Referring to FIG. 9, in step S901, the memory device 100 may determine whether the count value of the program loop is equal to or greater than a first reference count value. When the count value of the program loop is equal to or greater than the first reference count value, step S905 may be performed. When the count value of the program loop is smaller than the first reference count value, step S903 may be performed.

In the step S903, when the count value of the program loop is smaller than the first reference count value, the memory device 100 may determine the length of the floating period as a first length. The memory device 100 may float the common source line during the floating period having the first length in the program voltage apply operation.

In the step S905, the memory device 100 may determine whether the count value of the program loop is equal to or greater than a second reference count value. When the count value of the program loop is equal to or greater than the second reference count value, step S909 may be performed. When the count value of the program loop is smaller than the second reference count value, step S907 may be performed.

In the step S907, when the count value of the program loop is smaller than the second reference count value, the memory device 100 may determine the length of the floating period as a second length shorter than the first length.

In the step S909, when the count value of the program loop is equal to or greater than the second reference count value, the memory device 100 may determine the length of the floating period as a third length shorter than the second length.

In accordance with an embodiment of the present disclosure, there can be provided a memory device and an operating method of the memory device, which can reduce consumption of power or current, required in a program operation.

While the present disclosure has been shown and described with reference to certain examples of embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the examples of embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory device comprising:
   memory cells connected between a common source line and bit lines;
   a source line driver configured to apply a common source line voltage to the common source line and then float the common source line; and
   a program operation controller configured to control the source line driver to change a length of a floating period in which the common source line is floated, based on a degree to which a program operation on the memory cells is performed,
   wherein a starting point of the floating period is delayed as a number of times a plurality of program loops included in the program operation are performed increases.

2. The memory device of claim 1, wherein the program operation controller controls the source line driver to float the common source line while a program voltage apply operation included in the program operation is performed.

3. The memory device of claim 2, wherein the program voltage apply operation includes a program pulse period in which a program voltage is applied to a word line connected to the memory cells and a discharge period in which a voltage of the word line is discharged.

4. The memory device of claim 1, wherein the program operation controller includes a performance status information storage configured to store performance status information representing the degree to which the program operation is performed.

5. The memory device of claim 4, wherein the performance status information includes at least one of the number of times the plurality of program loops are performed, a number of memory cells programmed to a target program state among the memory cells, a magnitude of a program voltage applied to a word line connected to the memory cells, and a magnitude of a threshold voltage in a program state in which a pass and fail (pass/fail) check operation is performed.

6. The memory device of claim 5, wherein the length of the floating period becomes shorter, based on the number of times the plurality of program loops are performed.

7. The memory device of claim 5, wherein the program operation controller determines the length of the floating period, based on a result obtained by comparing the performance status information with a reference value.

8. The memory device of claim 7, wherein the program operation controller determines the length of the floating period as a first length when the performance status information is smaller than the reference value, and determines the length of the floating period as a second length shorter than the first length when the performance status information is equal to or greater than the reference value.

9. The memory device of claim 1, wherein the program operation controller controls the source line driver to change the length of the floating period, based on a position of a word line connected to the memory cells.

10. The memory device of claim 9, wherein the length of the floating period becomes longer as the word line is more adjacent to a drain select line.

11. The memory device of claim 9, wherein the length of the floating period becomes shorter as the word line is more adjacent to a source select line.

12. The memory device of claim 1, wherein the program operation controller controls the source line driver to apply the common source line voltage without floating the common source line, when data to be stored in memory cells to be programmed next to the memory cells is input while the program operation is performed.

13. A method of operating a memory device, the method comprising:
   performing a program voltage apply operation of programming selected memory cells among a plurality of memory cells;
   determining a length of a floating period in which a common source line is floated, based on a count value of a program loop in which the program voltage apply operation is included; and
   applying a common source line voltage to the common source line while the program voltage apply operation is performed, and then floating the common source line during the floating period,
   wherein a starting point of the floating period is delayed as the count value of the program loop increases.

14. The method of claim 13, wherein the program voltage apply operation includes a program pulse period in which a program voltage is applied to a selected word line connected to the selected memory cells and a discharge period in which a voltage of the selected word line is discharged.

15. The method of claim 13, wherein, in the determining of the length of the floating period, the length of the floating period is determined based on a result obtained by comparing the count value of the program loop with reference count values.

16. The method of claim 13, wherein, in the determining of the length of the floating period, the length of the floating period is determined as a first length when the count value of the program loop is smaller than a first reference count value, and is determined as a second length shorter than the first length when the count value of the program loop is equal to or greater than the first reference count value.

17. The method of claim 16, wherein, in the determining of the length of the floating period, the length of the floating period is determined as a third length shorter than the second length when the count value of the program loop is equal to or greater than a second reference count value greater than the first reference count value.

18. The method of claim 13, wherein, in the determining of the length of the floating period, the length of the floating period is determined based on a number of programmed word lines among a plurality of word lines connected to the plurality of memory cells.

19. The method of claim 18, wherein the length of the floating period becomes shorter as the number of programmed word lines becomes larger.

20. A memory system comprising:
a memory device; and
memory controller configured to control the memory device,
wherein the memory device comprising:
a plurality of memory cells connected between a common source line and bit lines;
a peripheral circuit configured to perform a program operation including a plurality of program loops, in which data is stored in selected memory cells among the plurality of memory cells; and
a program operation controller configured to control the peripheral circuit to apply a common source line voltage to the common source line in a program voltage apply operation included in any one program loop among the plurality of program loops and then float the common source line during a floating period,
wherein a length of the floating period is determined based on a count value of the one program loop,
wherein a starting point of the floating period is delayed as the count value of the program loop increases.

21. The memory system of claim 20, wherein the plurality of program loops include an initial period, a middle period, and an end period, and
wherein the program operation controller determines the length of the floating period as a first length when the count value of the one program loop corresponds to the initial period, and determines the length of the floating period as a second length shorter than the first length when the count value of the one program loop corresponds to the middle period.

22. The memory system of claim 21, wherein the program operation controller determines the length of the floating period as a third length shorter than the second length when the count value of the one program loop corresponds to the end period.

23. The memory system of claim 20, wherein the program voltage apply operation is an operation of applying a program voltage to a selected word line connected to the selected memory cells and then applying an equalizing voltage to a plurality of word lines connected to the plurality of memory cells.

* * * * *